Patented Dec. 9, 1941

2,265,682

UNITED STATES PATENT OFFICE 2,265,682

BONDING REFRACTORY MATERIALS

Owen G. Bennett, Edgewood, and Lawrence B. Berger, Carnegie, Pa.

No Drawing. Application April 18, 1939, Serial No. 268,636

17 Claims. (Cl. 252—206)

This invention relates to bonded refractory products, especially bonded products combining catalytic and refractory properties.

It is among the objects of the invention to provide a method of bonding refractory materials that is simple and easily practiced with inexpensive and commonly available apparatus, is cheap, and is productive of strongly bonded, hard articles.

A further object is to provide a method of bonding catalysts, especially metallic chromites, to provide hard and strong products adapted particularly to high temperature uses.

Yet other objects of the invention are to provide bonded refractory articles which are strong, hard, and resist abrasive influences, and which possess form-retaining properties when heated to elevated temperatures, and particularly to provide bonded catalysts for use at elevated temperatures, especially chromite catalysts, embodying in combination the foregoing properties together with retention of high and sustained catalytic activity.

The invention is predicated on our discovery that the combination of a bonding clay, such as bentonite, and a chromate provides, under the influence of heat, unexpectedly excellent bonding of refractory materials together with other properties that are desirable in articles, especially catalysts, used at elevated temperatures. For instance, the material to be bonded is mixed with a bonding clay, heated to develop a partial bond, impregnated with a chromate, and again heated to develop the fully bonded structure.

In the practice of the invention relatively small amounts of bonding clay suffice, and usually the use of only a minor proportion of bentonite or other similar bonding clay is desirable because where highly refractory properties are desired too great proportions of the clay may tend to depreciate the refractory qualities of the product. Also, a particularly important aspect of the invention resides in the bonding of chromite catalysts for the treatment of internal combustion engine exhaust gases, and we have found that the activity of such catalysts may be decreased undesirably if too large a proportion of bentonite is present in the bonded product. The exact amount will depend, of course, upon the refractory material being bonded and the qualities desired in the finished product, and therefore exact proportions can not be given which are applicable to all substances and materials.

Bentonite is the best known member of a class of bonding clays which possess swelling properties and are susceptible of irreversible dehydration upon being heated, and although it may be replaced in the practice of the invention by other minerals having similar properties, of which various members of the class are known, it will be referred to hereinafter for brevity and because it constitutes the preferred bonding clay in the practice of this invention.

For most purposes these refractory products are desired in shaped form, and suitably the mixture of refractory material, such, for example, as chrome ore, zircon sand, or the like, and bentonite is shaped prior to further treatment. To this end it is usually desirable to temper the mixture with a suitable liquid, such as water, in the manner known in the ceramic art. The amount of water used is that sufficient to convert the mixture to a moldable condition. The mass is then formed according to any suitable practice, as by molding, extrusion, or pelleting.

The formed mass is then heated to a temperature at which the bentonite or other bonding clay is irreversibly dehydrated. While the exact temperature may depend in part upon the condition and source of the bentonite, we now believe that heating to a temperature above about 300° C., suitably to 500° C., produces satisfactory results in many instances. After this treatment the shaped article is coherent and form retaining, and it may be handled satisfactorily. However, it is not sufficiently hard, resistant to crushing or abrasion to permit its use in this condition.

The mass in this condition is then impregnated with a chromate, suitably a metallic chromate, such as copper chromate. The impregnation may be accomplished most readily and simply by the use of an aqueous solution of the chromate into which the article is dipped, or with which it is sprayed. The impregnated mass is then again heated to effect the desired final bonding, and for most purposes it suffices to heat to the temperature used in the first heating step. This results in the production of a strongly bonded, very hard article which possesses substantial crushing strength and resistance to shock and to abrasion, particularly abrasion through contact with the same material.

As appears from what has been said, the initial heating of the bentonite-refractory material mixture merely converts the mixture into a form-retaining mass which is sufficiently coherent to permit impregnation with chromate, but which does not possess any particular strength or hardness. Similarly, impregnation of the material to be bonded with a chromate, followed by heating, is not productive of any substantial bonding action. Therefore, it would not have been expected that the application of the two agents in the manner described would produce these highly bonded products. The exact reactions which occur are not understood by us at this time.

The invention is applicable particularly to the bonding of oxygen compounds of chromium which possess refractory qualities desirable for some purposes, and especially to the bonding of metallic chromite catalysts for high temperature work. These catalysts are especially suitable for the treatment of internal combustion engine exhaust gases to remove objectionable constituents. Such catalysts, to be acceptable, must be capable of completely and continuously eliminating the total content of carbon monoxide and certain other constituents of internal combustion engine exhaust gases by oxidation, and in consequence of the large amount of heat liberated in such combustion the catalysts unavoidably operate at very high temperatures. Also, they must be capable of functioning at complete activity after being repeatedly heated to and cooled from operating temperature as a result of the intermittent operation of the engine, and of sustaining such activity throughout long periods of time.

These desidera are completely supplied by the metallic chromites, and of these copper chromites are particularly desirable because extensive experience with them in the treatment of internal combustion engine exhaust gases has shown that they possess not only the foregoing characteristics, but also that they start to function at relatively low temperatures, and that the starting temperature does not increase materially after long-continued periods of use.

In the use of such a catalyst, however, it is essential that the back-pressure of exhaust gas on the engine be not increased to an objectionable extent. Consequently the catalyst must be in a condition which offers little resistance to the flow of the exhaust gases, thus precluding its use in powdered form and necessitating its use in granular form or in a supported condition. For long-continued use of a given batch of catalyst the high temperatures involved render impracticable the use of metallic supports, such as foraminous metallic structures, and the same thing applies to the ordinarily used non-metallic catalyst supports as well as to pelleting of the catalyst material, particularly for use with automobile engines. The reason for this is that such masses of catalyst are subjected to severe vibration, abrasion, and shock when used in conjunction with an automobile engine, and consequently the catalyst masses must be capable of withstanding such factors to avoid powdering of the catalyst, which results either in its loss through the exhaust line, or in an increase in the exhaust back-pressure on the engine.

Since such catalytic material is resistant to the action of heat it embodies refractory qualities, and because of its importance in the field referred to it may be referred to in further description of, and by way of exemplifying, this invention.

We have discovered that the invention affords a means of bonding such chromite catalysts to provide them in a form which satisfies all of the mechanical requirements of the use to which reference has just been made. In one embodiment of this aspect of the invention the copper or other metallic chromite is mixed, suitably in a powdered or finely granular condition, with a small amount of bentonite, and water is then added to convert the mixture into a condition in which it can be readily pelleted or otherwise molded, following which the pellets or other shapes are heated to from 300° to 500° C. to irreversibly dehydrate the bentonite. Usually about 2 per cent of bentonite suffices to produce fully satisfactory bonding, and larger amounts may reduce the activity of the catalyst. After being heated the shapes are strong enough to permit satisfactory application of the following steps, but they could not be used directly for treating automobile engine gases because they would soon crumble and disintegrate.

The masses are then dipped in a solution of copper chromate, followed by heating in the manner described, which converts the formed masses into articles having physical properties as described above. The bonded masses are sufficiently porous for catalytic use, the activity of the catalyst is not impaired, and the masses are strong enough and possess resistance to abrasion such as to adapt them to various catalytic uses.

When these bonded catalysts are used under reducing conditions they may lose their hardness or strength to an extent such that they might not be suited to use where exposed to shock or vibration such as encountered in automobile operation. Perfectly satisfactory results are obtained, however, by bonding the catalysts in supported form. To this end there is used a refractory support which carries the catalyst and is bonded in accordance with the invention.

This embodiment may be described further with reference to the chromite catalysts. Chromic oxide is preferably used as a refractory support. It may be mixed with bentonite and molded into shapes which are dried and heated to dehydrate the clay. The masses are then impregnated with a chromate and again heated, followed by impregnation with the chromite catalyst. Most suitably, however, a combustible material, suitably carbon, is added to the clay-support mixture and at some stage the mass is heated to burn out the carbon and sinter the support material.

For example, chromic oxide is mixed with minor proportions of bentonite and carbon, the mass is tempered with water, and is then extruded to form shaped material. This is dried, as at room temperature and then at about 100° C., followed by heating to burn out the carbon, with final heating, to cause sintering, at about 1700° C. The product is then dipped in a chromate solution and again heated, say at least to 500° C., which produces the strong bonding, hardness and abrasion resistance which characterize the invention. If preferred, the original mixture may be heated to burn out the carbon, for example at red heat, and to dehydrate the clay, and then impregnated with chromate before firing at sintering temperature. In either case the bonded supports are finally treated with chromite catalyst, for example by dipping in a solution productive of the chromite upon heating. Such products are eminently suited to use in treating internal combustion engine exhaust gases.

Various modifications are permissible. Thus, sintering may be at, say, 1350° to 1700° C., and a plurality of chromites may be used where the use of a mixed catalyst is desirable. Also, other combustible materials, or vaporizable substances, may be used in place of carbon which is preferred, however, because of its low ash content. About 20 per cent by weight of carbon is ordinarily suitable although since it, the support and the clay serve largely physical functions, to support a catalyst, the proportions are not critical.

In general, however, too large amounts of bentonite should not be used.

The chromites referred to and their manner of use are described and claimed in the following patents in connection with the practice of whose inventions the present invention is particularly desirable: Patent No. 1,789,812, issued January 20, 1931; Patent No. 1,902,160, issued March 21, 1933; Patent No. 1,934,795, issued November 14, 1933; and Patent No. 2,031,475, issued February 18, 1936.

According to the provisions of the patent statutes, we have explained the principle and mode of practicing our invention, and have described what we now consider to be its best embodiment. However, we desire to have it understood that, within the scope of the appended claims, the invention may be practiced otherwise than as specifically described.

We claim:

1. That method of bonding refractory material which comprises providing a mixture of said material and a minor proportion of bentonite, molding the mixture, impregnating the mass with a chromate, and then heating to a temperature adapted to convert the formed and impregnated mass into a strongly bonded, hard, refractory mass.

2. A method according to claim 1, said chromate being copper chromate.

3. That method of bonding refractory material which comprises forming a mixture of said material, a minor proportion of bonding clay, and water in an amount to render the mass moldable, molding the mixture, heating the formed mass to a temperature to convert the formed mass to a form-retaining body, impregnating the mass with a chromate, and then heating to a temperature adapted to convert the formed and impregnated mass into a strongly bonded, hard, refractory mass.

4. That method of bonding refractory material which comprises forming a mixture of said material, a minor proportion of bentonite, and water in an amount to render the mass moldable, molding the mixture, heating the formed mass to a temperature at which the bentonite is irreversibly dehydrated, impregnating the mass with copper chromate, and then heating to a temperature adapted to convert the formed and impregnated mass into a strongly bonded, hard, refractory mass.

5. That method of bonding refractory material which comprises forming a mixture of said material, a minor proportion of bonding clay, and water in an amount to render the mass moldable, molding the mixture, heating the formed mass to at least about 300° C. to effect partial bonding, impregnating the mass with a chromate, and then reheating the formed and impregnated mass at a temperature to convert it into a strongly bonded, hard, refractory mass.

6. That method of bonding an oxygen compound of chromium which comprises forming a mixture of said compound, a minor proportion of bonding clay, and water in an amount to render the mass moldable, molding the mixture, heating the formed mass to a temperature at which said clay is dehydrated, impregnating the mass with a chromate, and then heating to a temperature adapted to convert the formed and impregnated mass into a strongly bonded, hard, refractory mass.

7. That method of bonding an oxygen compound of chromium which comprises forming a mixture of said compound, a minor proportion of bentonite, and water in an amount to render the mass moldable, molding the mixture, heating the formed mass to a temperature at which the bentonite is irreversibly dehydrated, impregnating the mass with a chromate, and then heating to a temperature adapted to convert the formed and impregnated mass into a strongly bonded, hard, refractory mass.

8. A method according to claim 7, said impregnating material being copper chromate.

9. A method according to claim 7, said oxygen compound of chromium being copper chromite.

10. That method of bonding copper chromite which comprises forming a mixture of said chromite, a minor proportion of bonding clay, and water in an amount to render the mass moldable, molding the mixture, heating the formed mass to a temperature at which said clay is irreversibly dehydrated, impregnating the mass with copper chromate solution, and then heating to a temperature adapted to convert the formed and impregnated mass into a strongly bonded, hard, refractory mass.

11. A method according to claim 10, said heating steps being conducted at a temperature of at least about 300° C.

12. That method of making a bonded metallic chromite product which comprises forming a mixture of chromic oxide, a minor proportion of bentonite and of carbon, and water in an amount to render the mass moldable, molding the mixture, heating the formed mass to a temperature at least high enough to irreversibly dehydrate said bentonite, impregnating the mass with a chromate, heating to at least about 300° C., burning carbon from the mass, impregnating the burned mass with said chromite and heating, and thereby producing a strongly bonded, hard, refractory mass.

13. That method of making a bonded metallic chromite product which comprises forming a mixture of chromic oxide, a minor proportion of bentonite and carbon, and water to render the mixture moldable, molding the mixture, heating the formed mass to a temperature of about 1350° to 1750° C., impregnating the mass with a metallic chromate, heating to at least about 300° C., and then impregnating with said chromite, and thereby producing a strongly bonded, hard, refractory mass.

14. As a new article of manufacture, a shaped and fired refractory formed from refractory material and bentonite impregnated with a chromate, the article being strongly bonded, hard, and resistant to shock and abrasion.

15. As a new article of manufacture, a shaped and fired refractory formed from an oxygen compound of chromium and bentonite impregnated with a metallic chromate, the article being strongly bonded, hard, and resistant to shock and abrasion.

16. As a new article of manufacture, a shaped and fired chromite catalyst formed from a chromate impregnated mixture of copper chromite and a bonding clay, the article being strongly bonded, hard and resistant to shock and abrasion.

17. As a new article of manufacture, a shaped and fired catalyst mass formed from a copper chromate impregnated mixture of a major proportion of copper chromite and a minor proportion of bentonite, the article being strongly bonded, hard, and resistant to shock and abrasion.

OWEN G. BENNETT.
LAWRENCE B. BERGER.